Patented May 20, 1952

2,597,471

UNITED STATES PATENT OFFICE 2,597,471

EQUILENIN-3-MONOSULFATE AND ALKALINE SALTS THEREOF

Gordon A. Grant, Montreal, Quebec, and William L. Glen, Baie d'Urfe, Quebec, Canada, assignors to Ayerst, McKenna & Harrison, Limited, St. Laurent, Quebec, Canada, a corporation of Canada No Drawing. Application July 20, 1948, Serial No. 39,819

8 Claims. (Cl. 260—239.5)

1

This invention relates to new water-soluble hormone products and to their preparation. More specifically it relates to the preparation of equilenin sulphate and its salts.

The applicants have found that when the water-insoluble sterol equilenin is treated with a sulphating agent, a hitherto unknown compound is obtained, the 3 monosulphate of equilenin, which compound, in addition to being water-soluble, possesses high oral oestrogenic activity.

The equilenin sulphate may be used in the form of its inorganic and organic salts.

The synthesis is carried out by reacting equilenin in solution in a dry organic solvent, for example, dry pyridine and chloroform, with a sulphating agent, for example, chlorosulphonic acid. After the reaction has gone to completion, the solvents are removed by concentration in vacuo. The resulting product contains equilenin sulphate, probably as the pyridine salt. For preparation of the sodium salt, the above product is dissolved in an alcohol, for example, methyl alcohol, and neutralized with alcoholic sodium hydroxide. After centrifugation, an excess of ether is added to the clear supernatant, and this results in the separation of the sodium equilenin sulphate as a precipitate. This can be further purified by treatment of its solution in alcohol with a little activated carbon, filtration, and reprecipitation by the addition of an excess of ether to the clear filtrate.

The precipitated sodium equilenin 3 monosulphate is filtered off and dried, and is obtained as a white powder, which in contradistinction to the original equilenin, is freely soluble in water.

The sodium salt of the new compound analyses for $C_{18}H_{17}O_5NaS$ and can probably be represented by the following structural formula:

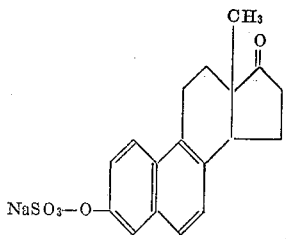

This formula is given merely as a temporary assumption and may later be shown to require modification.

An oestrogenic response is obtained when the sodium equilenin sulphate is administered orally to ovariectomised adult rats in a total dosage of from 1 to 2 mgs.

2

Inorganic salts other than the sodium salt can be prepared by using the appropriate metal ion hydroxide, for example, potassium, calcium, barium, lithium or ammonium. In addition to the pyridine salt, other organic salts can be prepared using organic bases (for example, quinoline, picoline, piperidine) as the neutralising agents. Salts of alkaloidal bases can also be prepared, for example, the quinidine salt can be obtained as a precipitate from aqueous solutions of sodium equilenin sulphate upon the addition of a solution of a water-soluble quinidine salt, for example, quinidine sulphate.

It is understood that in synthesis of the new derivative, other sulphating agents, for example, pyridine sulphur trioxide, can be employed without departing from the spirit of the invention.

EXAMPLES

The following examples illustrate the invention in detail but it is to be understood that the examples are merely illustrative and not to be considered limitative either of the particular reactants indicated, or of the particular conditions described. As will be obvious to those skilled in the art, equivalent substances may be used in place of those mentioned and the reaction conditions may be varied to an appreciable extent.

Example 1

570 mgs. equilenin dissolved in 10 cc. of dry pyridine, and the solution diluted with 20 cc. of dry chloroform was added slowly to a mixture of 0.16 cc. chlorosulphonic acid in 10 cc. dry chloroform and 5 cc. dry pyridine.

The mixture was made in a flask immersed in an ice-water bath with precautions to exclude moisture. The mixture was then kept at room temperature in the dark, in the stoppered flask, for 24 hours to allow the reaction to proceed to completion.

The solvents were then removed under vacuum. 50 ccs. of ether were added with agitation, this was then decanted off, and the washing repeated.

The ether-insoluble material was taken up in 20 cc. of absolute methanol and the solution was neutralized with 5.1 cc. 1N methanolic NaOH. The final pH was 8–8.3.

The mixture was centrifuged and the clear supernatant precipitated with an excess of ether. The precipitate was centrifuged off and redissolved in 20 cc. absolute methanol and shaken with a little activated carbon, after filtration the solution was precipitated with an excess of ether.

The sodium equilenin sulphate was thus obtained as a white freely water-soluble powder, containing the expected content of equilenin as determined by the Marrian-Kober estimation. Theory for $C_{18}H_{17}O_5SNa.H_2O$ requires C 55.9%; H 4.92%; S 8.3%.

A sample of the new compound gave the following analysis:

C 55.59%; 55.54%
H 4.67%; 4.86%
S 8.31%

Example II

To an aqueous solution of sodium equilenin sulphate was added an aqueous solution of quinidine sulphate. The precipitate was filtered off, and washed with water and dried in vacuo, quinidine equilenin sulphate was thus obtained as a white powder and contained the expected equilenin content as determined by the usual Marrian-Kober colorimetric estimation.

Example III

To an aqueous solution of sodium equilenin sulphate was added an aqueous solution of $BaCl_2$. The precipitate was filtered off and dried in vacuo. The barium equilenin sulphate was obtained as a white powder, and contained the expected equilenin content, as estimated by the usual Marrian-Kober colorimetric oestrogen determination.

Example IV

To a concentrated aqueous solution of sodium equilenin sulphate was added an aqueous solution of $CaCl_2$. The precipitate was filtered off, washed with a little cold $H_2O$ and dried in vacuo. The calcium equilenin sulphate was obtained as a white powder and contained the expected equilenin content, as determined by the usual Marrian-Kober colorimetric oestrogen estimation.

Example V 0.5 g. of quinidine equilenin sulphate was suspended in 40 cc. of ether and shaken with 0.04 g. of sulphuric acid. After filtration, and cautious evaporation of the filtrate, the unstable free ester of equilenin sulphate was obtained as a cream colored powder.

Example VI 50 mgs. of equilenin was treated with chlorosulphonic acid as described in Example I and the resultant product neutralized with methanolic 1N KOH solution in place of sodium hydroxide.

After filtration, the clear filtrate was precipitated with an excess of ether. The precipitate was redissolved in methanol and shaken with a little norite, filtered, and reprecipitated with an excess of ether. The potassium equilenin sulphate was obtained as a white water-soluble powder and containing about 60% equilenin as determined by the colorimetric Marrian-Kober estimation for oestrogens.

It will be noted from the above examples that the salts formed are those produced by the interaction of an acidic material, that is, equilenin 3 monosulphate, with an organic or inorganic base.

As used in the claims, the term "alkaline salt" is intended to mean a product such as will be formed by the neutralization of equilenin 3 monosulphate, with an organic or inorganic base and is not intended to be restricted to compounds having a basic reaction.

We claim:

1. A new compound selected from the group consisting of equilenin 3 monosulphate and the alkaline salts thereof.

2. An alkaline salt of equilenin-3-monosulphate.

3. As a new compound equilenin-3-monosulphate.

4. As a new compound sodium equilenin-3-monosulphate.

5. As a new compound quinidine equilenin-3-monosulphate.

6. As a new compound potassium equilenin-3-monosulphate.

7. A process for making an equilenin sulphate, comprising subjecting equilenin to the action of a sulphating agent in the presence of an inert solvent at low temperature to prevent hydrolysis thereby to convert the free hydroxyl group into the corresponding sulphate, removing the solvent by evaporation under reduced pressure, and after neutralisation, separating the equilenin sulphate in the form of an alkaline salt.

8. A process for making sodium equilenin sulphate comprising reacting equilenin in solution in dry pyridine and chloroform, with chlorosulphonic acid, under conditions to avoid hydrolysis, evaporating the solvent under relatively low temperature conditions, solubilizing the residue in alcohol, neutralizing the alcoholic solution with alcoholic sodium hydroxide, separating the liquid fraction and finally adding ether to obtain precipitated sodium equilenin sulphate.

GORDON A. GRANT.
WILLIAM L. GLEN.

REFERENCES CITED

The following references are of record in the file of this patent:

UNITED STATES PATENTS

| Number | Name | Date |
|---|---|---|
| 2,005,700 | Johannessohn et al. | June 18, 1935 |
| 2,047,307 | Butenandt | July 14, 1936 |
| 2,228,397 | Miescher et al. | Jan. 14, 1941 |
| 2,305,727 | Miescher et al. | Dec. 22, 1942 |

FOREIGN PATENTS

| Number | Country | Date |
|---|---|---|
| 177,414 | Switzerland | Oct. 1, 1935 |
| 499,794 | Great Britain | Jan. 30, 1939 |